United States Patent

[11] 3,627,352

| | | | |
|---|---|---|---|
| [72] | Inventor | Jack Canole | |
| | | Cerritos, Calif. | |
| [21] | Appl. No. | 852,638 | |
| [22] | Filed | Aug. 25, 1969 | |
| [45] | Patented | Dec. 14, 1971 | |
| [73] | Assignee | Signal Trucking Service, Ltd. | |
| | | Los Angeles, Calif. | |

[54] DRAWBAR CONSTRUCTION
10 Claims, 3 Drawing Figs.

[52] U.S. Cl............................................. 280/475,
280/491 B, 280/491 D, 280/150.5, 280/500
[51] Int. Cl...................................................... B60d 1/14
[50] Field of Search........................................... 280/475,
476, 491, 150.5, 489, 490, 498, 150, 478, 495,
496, 500, 501

[56] References Cited
UNITED STATES PATENTS

| 2,438,032 | 3/1948 | Bready.......................... | 280/490 X |
| 2,634,941 | 4/1953 | Eckert........................... | 280/150.5 |
| 2,880,016 | 3/1959 | Peterson....................... | 280/500 X |
| 2,958,543 | 11/1960 | Cooper et al. ................ | 280/491.2 |
| 3,093,394 | 6/1963 | McCollum.................... | 280/150.5 X |
| 3,146,002 | 8/1964 | Faber............................ | 280/475 |
| 3,419,285 | 12/1968 | Morehouse et al. .......... | 280/491.5 |

Primary Examiner—Benjamin Hersh
Assistant Examiner—John P. Silverstrim
Attorney—Fulwider, Patton, Rieber, Lee & Utecht ABSTRACT: A drawbar construction for a self-propelled vehicle adapted to be towed in tandem from a lead vehicle comprised of angularly disposed struts converging to a point where they support a hitch eye, and having their remote ends rotatably mounted on the frame of the vehicle to be towed. Latch means at the front of the vehicle hold the drawbar in inoperative, substantially vertical position against the front of the vehicle. Pivotally mounted on a crossbar between the struts is a supporting leg adapted to be latched to the drawbar in inoperative position, and rotatable relative to the drawbar into a vertical position where it supports the drawbar hitch eye in position to be engaged automatically with a hitch on the lead vehicle. The supporting leg for the drawbar is vertically adjustable to locate the hitch eye in proper relation for its engagement with the forward hitch.

PATENTED DEC 14 1971
3,627,352
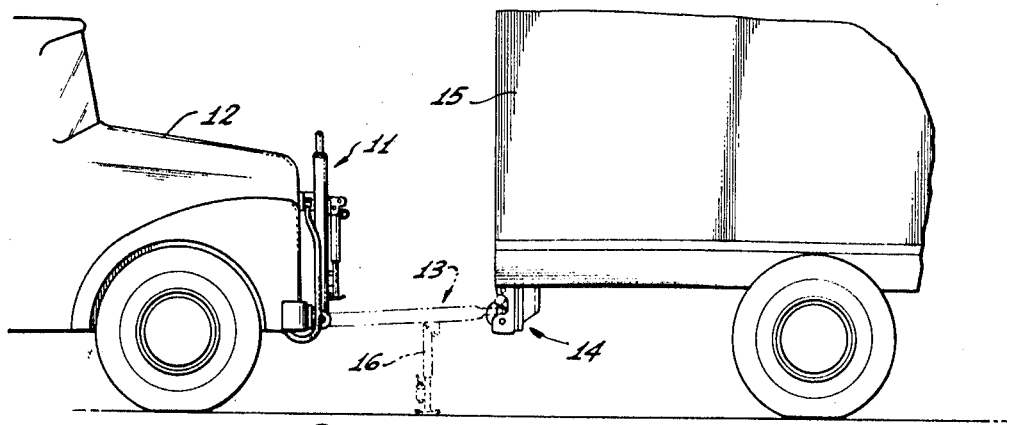
Fig.1
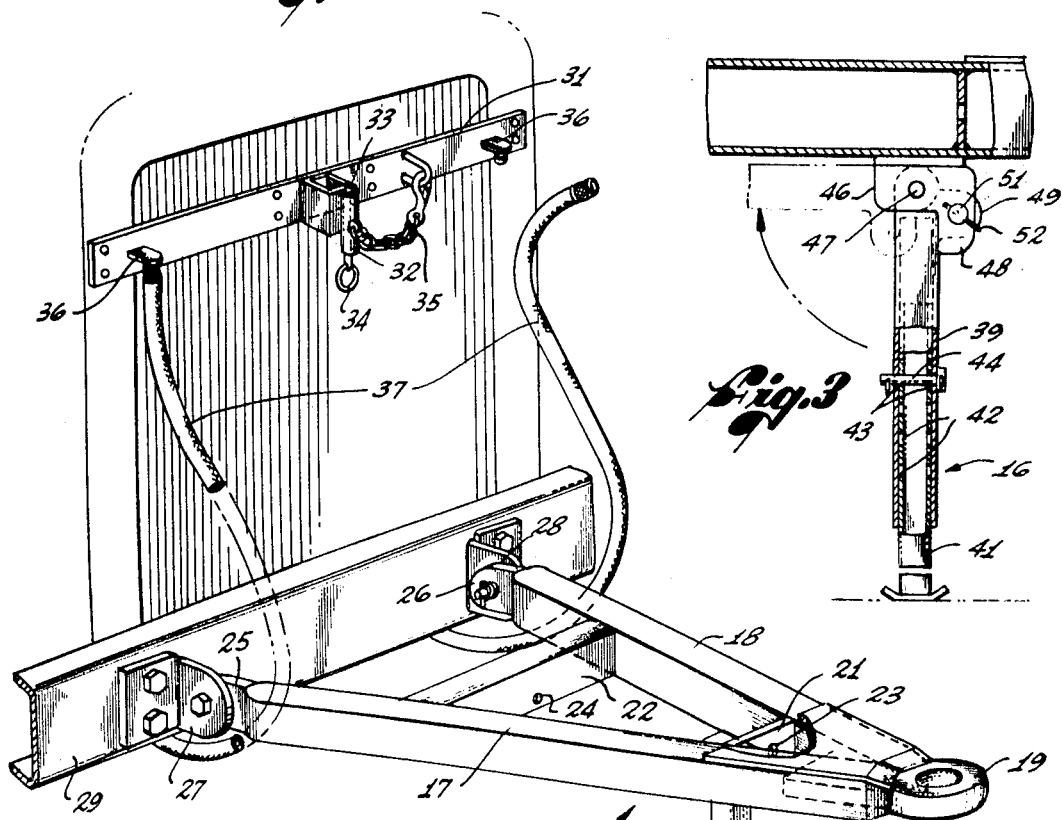
Fig.2
Fig.3
INVENTOR.
JACK CANOLE
BY Fulwider, Patton, Rieber
Lee, and Utecht
ATTORNEYS

DRAWBAR CONSTRUCTION

SUMMARY OF THE INVENTION

The drawbar of the present invention comprises angularly disposed struts converging to a point where they rigidly support a hitch eye. Crossbars of angular form extend transversely between the struts, and the spaced ends of the struts are pivotally mounted on brackets rigidly secured to the bumper or frame of a self-propelled vehicle to be towed.

An auxiliary bar is mounted on the vehicle vertically spaced above the pivotal mounting of the struts, and a latching means in the form of a spring-biased plunger is mounted on the auxiliary bar and cooperates with an opening in the upper of the crossbars for locking the drawbar in an inoperative, vertical position at the front of the vehicle, when it is to perform its self-propelled function. The same crossbar to which latching in operative position is effected also pivotally carries a leg which supports the drawbar elevated from the ground in position for automatic engagement of the hitch eye on a hitch carried by a lead vehicle. The supporting leg has an ear thereon, cooperating with an ear rigid with the crossbar, for locking the supporting leg in vertical position. The supporting leg is comprised of two telescoping members, the inner of which has a plurality of spaced pairs of holes therein, and a pin is provided passing through both of the legs and adjustable with respect to said pairs of holes for adjusting the length of the supporting leg and, therefore, the position of the latch eye above the ground.

A second crossbar in the drawbar has a latching opening therein, and the supporting leg carries a latch, again in the form of a spring-biased plunger, which engages in the second crossbar to lock the leg in position substantially parallel to the plane of the drawbar. Thus, with the leg latched to the drawbar and the drawbar latched to the auxiliary bar at the front of the vehicle, the parts are rigidly secured at the front of the vehicle out of the way while it is performing its self-propelled mission. At the same time, the latches may readily be released and the drawbar swung into a substantially horizontal position with the supporting leg substantially vertical and adjusted to locate the hitching eye for automatic engagement with the hitch on the lead vehicle, thus providing for ready connection of two vehicles together in tandem by a single operator. The supporting leg is thereafter swung up parallel to the drawbar and locked out of the way.

The auxiliary bar at the front of the vehicle may be provided with means for holding the pneumatic and other connection means between the tandem vehicles, and the latch on the auxiliary bar may be provided with a chain for safety latching of the towbar in its raised position.

The drawbar construction of this invention enables a single operator to hook up a pair of self-propelled vehicles in tandem and, driving only the towing vehicle, move both vehicles, in off hours, to ready positions for take-over by individual operators for self-propulsion in a work period.

Other objects and features of the invention, and of the use thereof, will be apparent to those skilled in the art from the detailed description.

BRIEF DESCRIPTION OF THE DRAWINGS

FIG. 1 is an elevational view of the drawbar construction according to the present invention, shown in elevated position at the front of self-propelled vehicle and with the tandem connection for the drawbar, in supported position, shown in phantom;

FIG. 2 is a perspective view of the drawbar in substantially horizontal supported position to be engaged by the hitch of the lead vehicle; and FIG. 3 is a view, partly in section, showing the construction of the supporting leg.

DETAILED DESCRIPTION

The drawbar construction of the present invention is indicated generally at 11 in FIG. 1 mounted on the front of a self-propelled vehicle 12, such as a truck, and also shown in phantom at 13 in its position just engaged with the hitch 14 at the back of a lead vehicle 15, which is to tow the vehicle 12 in tandem. Before towing is effected, the vertical supporting leg 16 is elevated and locked in its position substantially parallel to the plane of the drawbar 13, in the relative position shown in dotted lines in FIG. 3.

The drawbar proper is composed of a pair of angularly related struts 17 and 18 which converge to a point at one end, where they support hitch eye 19 rigidly welded or otherwise secured thereto. The struts 17 and 18 have welded thereto upper and lower crossbars 21 and 22, respectively, having locking holes 23 and 24 therein. The spaced ends of the struts 17 and 18 have lugs 25 and 26, respectively, rigidly secured to the front bumper or frame 29 of the vehicle 12, whereby the drawbar formed by the struts 17 and 18 is freely swingable from the position 13 to the position 11, and vice versa so as to be supported out of the way at the front of the vehicle or lowered for connection of the vehicle in tandem to a lead vehicle to be towed thereby.

An auxiliary bar 31 is supported at the front of the vehicle above the brackets 27 and 28 and has a latching means 32 thereon in the form of a spring-biased plunger 33 adapted to be retracted by a finger ring 34. Carried by the latch 32 is an auxiliary safety chain 35 adapted to be secured about the elevated drawbar. The plunger 33 is adapted to be received in the opening 23 to latch the drawbar in its upper position shown in full lines in FIG. 1. The auxiliary bar 31 may also carry connectors 36 to support the flexible tubes 37 of the pneumatic system out of the way.

The supporting leg for holding the hitch eye 19 in elevated position is shown at 16, comprising upper and lower telescoping sections 39 and 41. The inner section 41 has opposed pairs of vertically spaced holes 42 therein, and the outer section 39 has a pair of horizontally opposed holes 43 therein through which extends a pin 44, which is adjustable with respect to the vertical pairs of holes 42, whereby the amount of telescoping of the member 41 in the member 39 is controlled, and thereby the length of the leg 38 and the position of the hitch eye above the ground. The pin 44 has a conventional wire keeper 45, as shown.

The upper crossbar 21 has a pair of depending ears 46 between which the upper section 39 of the leg 16 is pivoted at 47. The ears 46 have extensions at 48 with spaced openings therethrough, and the leg section 39 has an ear 49 with matching openings through which extends a pin 51, when the leg 16 is in its vertical position, as shown in full lines in FIG. 3, thereby locking the leg relative to the crossbar. The pin 51 may also have a conventional wire keeper 52.

To lock the leg 16 relative to the drawbar 11, it has a latch 53 rigidly secured to the section 41, the latch having a spring-biased locking plunger 54 and a finger ring 55 for manipulating it to retracted position. The locking plunger 54 cooperates with the opening 24 to lock the leg 16 in a position substantially parallel to the plane of the drawbar 11, as shown in full lines in FIG. 1 and in dotted lines in FIG. 3.

The operation of the drawbar of this invention will be apparent from the above description. It is shown in full lines in FIG. 1 in its elevated position locked to the front of the vehicle 12, for operation of that vehicle under self-propulsion. With release of the chain 35 and the latch 32 by retraction of the plunger 33, the drawbar may be swung down to the dotted-line position 13, also shown in FIG. 2. Also the leg 16 is released by operating the latch 53 to release its plunger 54 from the opening 24, and the leg 16 is swung down to the Dotted-line position of FIG. 1 and to the full line positions of FIGS. 2 and 3. Should the length of the leg 16 require adjustment, it is effected by adjusting the position of the telescopic section 41 within the section 39 and locking it in place by the pin 44. This adjustment is made to hold the hitch eye 19 in a position elevated from the ground so that it will exactly receive the hitch 14 on a lead vehicle 15, whereby, with the drawbar supported by the leg 16, as in the figures, the lead vehicle 15 is manipulated by a single operator to engage its hitch with the hitch eye 19, thereby permitting automatic joining of the vehicles in tandem with a single operator. After the hitch is completed, the leg 16 is elevated back parallel to the plane of the drawbar 11, as shown in dotted lines in FIG. 3, with engagement of the latching plunger 54 in the opening 24, the leg 16 being thus held upward during the tandem operation of the two vehicles.

When tandem operation is completed, the hitch 14 is released from the eye 19 and the drawbar 11 swung upward to the full-line position of FIG. 1, where the latching plunger 33 engages in the opening 23, and the emergency chain 35 is secured about the crossbar 21 or a drawbar strut 17 or 18 to prevent involuntary lowering of the drawbar. It will be understood that in the movements of the leg 16 into its vertical supporting position and into its substantially horizontal running position, the pin 51 is removed and inserted, as required, to disengage and engage the ear 49 in the extensions 48 to thereby unlock and lock the leg 16 with respect to the drawbar in supported and supporting positions.

While a certain preferred embodiment of the invention has been specifically illustrated and described, the invention is not limited thereto, as many variations will be apparent to those skilled in the art.

I claim:

1. A drawbar construction for a self-propelled vehicle to be operated in tandem by a towing vehicle comprising:
   a pair of angularly disposed struts converging to a point;
   a hitch eye rigidly secured to and supported by said struts at said point;
   a pair of substantially horizontal spaced crossbars interconnecting said struts;
   means pivotally mounting the spaced ends of said struts to brackets rigidly mounted on said first-mentioned vehicle;
   latch means mounted on said first-mentioned vehicle above said brackets;
   means on the crossbar adjacent said hitch eye for engaging with said latch means;
   a supporting leg pivotally mounted on said drawbar for swinging movement from a position parallel to the plane of the drawbar to a position substantially at right angles thereto;
   means for locking said supporting leg in its two positions;
   means for adjusting the length of said supporting leg to adjust the position of the hitch eye above the ground for automatic engagement in a hitch mounted on the towing vehicle;
   in which said supporting leg-locking means comprises a latch carried on the leg and engageable with a crossbar on the drawbar to hold the leg in a position substantially parallel to the plane of the drawbar; and
   a pin and hole arrangement operating with the leg substantially vertical for locking it in a position for holding the hitch eye elevated.

2. The drawbar construction of claim 1, including:
   said supporting leg being of telescoping construction with cooperating pins and holes for determining the degree of telescoping and the height at which the hitch eye is held by the leg above the ground.

3. The drawbar arrangement of claim 1, including:
   said vehicle-mounted latch means being a spring-biased plunger cooperating with an opening in the crossbar adjacent the hitch eye for locking the drawbar in raised position.

4. The drawbar construction of claim 1, including:
   an auxiliary bar disposed above said brackets, said latch means being mounted on said auxiliary bar; and
   means on said auxiliary bar for holding temporary connections between the tandem vehicles out of the way when the drawbar is raised.

5. The drawbar construction defined in claim 1, in which said supporting leg-locking means further includes:
   an ear at the upper end of said leg;
   an ear depending from said drawbar;
   means pivoting said ears together for swinging movement of the leg relative to the crossbar; and
   cooperating holes in said ears in addition to said pivoting means for receiving a pin for locking said leg in its vertical-supporting position at substantially right angles to the plane of the drawbar.

6. A drawbar construction for a self-propelled vehicle to be operated in tandem by a towing vehicle comprising:
   a pair of angularly disposed struts converging to a point;
   a hitch eye rigidly secured to and supported by said struts at said point;
   a pair of substantially horizontal-spaced crossbars interconnecting said struts;
   means pivotally mounting the spaced ends of said struts to brackets rigidly mounted on said first-mentioned vehicle;
   latch means mounted on said first-mentioned vehicle above said brackets;
   means on the crossbar adjacent said hitch eye for engaging with said latch means;
   a supporting leg pivotally mounted on said drawbar for swinging movement from a position parallel to he plane of the drawbar to a position substantially at right angles thereto;
   means for locking said supporting leg in its two positions;
   means for adjusting the length of said supporting leg to adjust the position of the hitch eye above the ground for automatic engagement in a hitch mounted on the towing vehicle; and
   wherein one of the locking means for the leg comprises a spring-biased plunger thereon cooperating with an opening in the crossbar remote from said hitch eye for latching said leg in a position substantially parallel to the plane of the drawbar.

7. The drawbar construction of claim 6, including:
   said supporting leg being of telescoping construction with cooperating pins and holes for determining the degree of telescoping and the height at which the hitch eye is held by the leg above the ground.

8. The drawbar arrangement of claim 6, including:
   said vehicle-mounted latch means being a spring-biased plunger cooperating with an opening in the crossbar adjacent the hitch eye for locking the drawbar in raised position.

9. The drawbar construction of claim 6, including:
   an auxiliary bar disposed above said brackets, said latch means being mounted on said auxiliary bar; and
   means on said auxiliary bar for holding temporary connections between the tandem vehicles out of the way when the drawbar is raised.

10. The drawbar construction defined in claim 6, in which said locking means for the leg further comprises:
    an ear at the upper end of said leg;
    an ear depending from said drawbar;
    means pivoting said ears together for swinging movement of the leg relative to the crossbar; and
    cooperating holes in said ears in addition to said pivoting means for receiving a pin for locking said leg in its vertical supporting position at substantially right angles to the plane of the drawbar.

* * * * *